(12) United States Patent  
Morimoto

(10) Patent No.: US 6,778,809 B2  
(45) Date of Patent: Aug. 17, 2004

US006778809B2

(54) MOBILE NETWORK FOR REMOTE SERVICE AREAS USING MOBILE STATIONS

(76) Inventor: Nobuyoshi Morimoto, 29-10-106, Sakuragaoka-cho, Shibuyaku, Tokyo (JP)

( * ) Notice: Subject to any disclaimer, the term of this patent is extended or adjusted under 35 U.S.C. 154(b) by 704 days.

(21) Appl. No.: 09/827,065

(22) Filed: Apr. 3, 2001

(65) Prior Publication Data

US 2002/0142717 A1 Oct. 3, 2002

(51) Int. Cl.[7] .............................................. H04Q 7/00
(52) U.S. Cl. ...................................... 455/11.1; 455/445
(58) Field of Search ........................... 455/11.1, 7, 13.1, 455/41.2, 445; 370/338

(56) References Cited

U.S. PATENT DOCUMENTS

| | | | |
|---|---|---|---|
| 4,124,815 A | 11/1978 | Stoschek | |
| 4,539,706 A | 9/1985 | Mears et al. | |
| 4,553,263 A | 11/1985 | Smith et al. | |
| 5,056,085 A | 10/1991 | Vu | |
| 5,481,539 A | * 1/1996 | Hershey et al. | 370/312 |
| 5,530,963 A | 6/1996 | Moore et al. | |
| 5,862,345 A | 1/1999 | Okanoue et al. | |
| 5,907,540 A | * 5/1999 | Hayashi | 370/315 |
| 5,987,011 A | * 11/1999 | Toh | 370/331 |
| 6,044,062 A | 3/2000 | Brownrigg et al. | |
| 6,141,533 A | 10/2000 | Wilson et al. | |
| 6,199,099 B1 | 3/2001 | Gershman et al. | |
| 6,201,976 B1 | 3/2001 | Rasanen | |
| 6,236,337 B1 | 5/2001 | Beier et al. | |
| 6,349,224 B1 | 2/2002 | Lim | |

FOREIGN PATENT DOCUMENTS

| | | |
|---|---|---|
| DE | 198 37 568 | 6/1999 |
| GB | 2 326 059 | 12/1998 |

OTHER PUBLICATIONS

Ogata Kazuyuki, Patent Abstracts of Japan, publication No. 10336094, published Dec. 18, 1998, 1 page.
International Search Report for PCT/JP 02/03346, mailed Jun. 13, 2003, 7 pages.
"Wireless Communications Facilities Issues Paper," San Diego Association of Governments, Dec. 1995, 36 pages.
"World Wide Wireless Communications, Inc. (WLGS)," Annual Report (SEC form 10KSB), Dec. 28, 2000, 19 pages.

* cited by examiner

*Primary Examiner*—Nick Corsaro
(74) *Attorney, Agent, or Firm*—Robert C. Kowert; Meyertons, Hood, Kivlin, Kowert & Goetzel, P.C.

(57) ABSTRACT

A system and method for transmitting and receiving data in a mobile communications network. The system includes one or more mobile station for transmitting data in a mobile digital network. The mobile stations are configured to act as buffer/repeaters by storing and forwarding data signals until they are received by a designated destination station. The mobile stations include an antenna, a transceiver coupled to the antenna, a processor coupled to the transceiver, a data storage memory coupled to the processor, and a power supply. The processor may be configured to cause the transceiver to broadcast interrogation signals to determine whether other mobile or base stations are present for store-forwarding.

34 Claims, 5 Drawing Sheets

MOBILE NETWORK FOR REMOTE SERVICE AREAS USING MOBILE STATIONS

BACKGROUND OF THE INVENTION

1. Field of the Invention

The present invention generally relates to the field of mobile wireless networking, and more particularly to a system, method, and apparatus for transmitting and receiving data in a mobile communications network.

2. Description of the Related Art

Communication networks, for example the mobile telephone network according to the GSM standard (Global System for Mobile Communication), enable communication connections to mobile stations of mobile subscribers via a radio interface. These networks use radio-based components that set up, maintain and dismantle by communications links by transmitting and receiving signaling and traffic information (e.g. in the form of speech or data) in both transmission directions via the radio interface. Mobile subscribers access the communications network by means of mobile stations, which can communicate in wireless fashion with radio stations (base stations) arranged in distributed fashion at the network side. These base stations are often configured into cellular systems.

Cellular systems are composed of interconnected neighboring "cell sites." These cell sites operate low power facilities (facilities that function on low amounts of electric energy). The cellular telephone industry is limited to 45 MHz of spectrum bandwidth, which without frequency-reuse, would limit each cellular carrier to 396 frequencies or voice channels. In order to increase calling capacity, these low power facilities "reuse" frequencies on the electromagnetic spectrum. The manner in which providers organize, or "configure," their cells is an important factor in increasing frequency reuse and establishing an area's calling capacity. One such configuration is an "omni cell" configuration, which is often used in rural areas. Cells in urban areas often use a sector cell configuration. The omni cell configuration uses omni-directional or whip antennas that emit signals in 360 degrees. Whip antennas do not lend themselves to frequency reuse as well as sector antennas. As a result, omni cell configurations are generally used in rural areas since these areas are sparsely populated and consequently do not need extra calling capacity. Urban areas, on the other hand, have denser populations and require additional calling capacity to accommodate the system's greater number of users. The sector cell configuration provides this extra calling capacity by utilizing sector or panel antennas that divide the omni cell into three segments. The three segments use different frequencies, allowing greater reuse of the channels. Because they have the capacity to handle large volumes of calls, sectored sites are used particularly in areas near high vehicular activity such as freeways and major intersections. Although a cell site's radius depends upon its surrounding topography and its capacity to handle calls, cell sites in rural areas generally have a radius between five and twelve miles, and cell sites in urban areas typically have a radius between two and five miles.

There are three basic types of cell sites. Coverage sites serve to expand coverage in large areas or in areas with difficult terrain and to enhance coverage for portable systems. These sites allow users to make and maintain calls as they travel between cells. Capacity sites serve to increase a site's capacity to handle calls when surrounding sites have reached their practical channel limits. Transition sites are needed for frequency reuse. Antennas mounted on tall support structures sometimes create a problem in frequency reuse because they "see" everything and overlap into the next cell sites coverage area. In order to control frequency reuse problems, these tall structures must be removed and replaced by transition sites. Transition sites allow the cellular company to increase the capacity of calls and maintain coverage simultaneously.

Traditionally, cellular phones have utilized analog transmission signals. In the analog technology, voice messages are electronically replicated and amplified as they are carried from the transmitting antenna to the receiving antenna. A problem with this technology is that the amplification procedure tends to pick up "noise," sometimes making the message difficult to hear. In order to diminish this noise and to provide greater calling capacity per channel, the cellular industry has is transitioning to digital transmission signals. In the digital technology, voice messages are converted into digits (zeroes and ones) that represent sound intensities at specific points in time. Because natural pauses in the conversation are eliminated, more calling capacity becomes available from the same amount of spectrum, thus reducing the need for new sites. An added benefit is that the background noise that is generally heard in the analog system becomes inaudible. The graphic difference between the two technologies is that analog signals are transmitted as continuous waves while digital technology converts the analog signal to binary digits.

There are currently two popular forms of digital technology: time division multiple access (TDMA) and code division multiple access (CDMA). Both of these forms of digital technology attempt to provide multiple access over one frequency, or channel. While TDMA may increase calling capacity three to ten times over analog technology, CDMA may increase calling capacity by ten to twenty times. Cell phones have recently added wireless access protocol (WAP) to allow more digital functions such as limited Internet access. In 2001, G3 (third generation) cell phones are expected to appear. G3 cell phones should supersede current cell phones because G3 phones will be able to attain a data transfer rate of 144 Kbps (under ideal conditions). Bluetooth-enabled cellular phones are also due in 2001. As with personal computers (PCs) and personal digital assistants (PDAs), Bluetooth cell phones will let users wirelessly transfer data among other Bluetooth devices. Bluetooth is a hotly anticipated feature in the cell phone market. Bluetooth is designed to enable users to create their own local-area network (LAN) or personal area network (PAN).

All of these advances, together with the proliferation of the Internet, have increased the demand for seamless wireless digital messaging and Internet connections. While the above mentioned cellular systems work well in areas of relatively high population density (e.g., in metropolitan areas), they are not accessible in many areas of the world. One such area in particular are the transoceanic shipping lanes used by freight vessels. The crews and passengers of these ships are typically unable to utilize their cell phones, two-way pagers, wireless email appliances, or Internet browsers unless they are in a port.

While satellites do offer the possibility of a connection to land-based digital networks, the costs associated with satellite communications (e.g., both hardware and airtime) may render it too expense for some cost-sensitive commercial shipping and fishing vessels. This may particularly be true for "low priority" uses such as personal emails between crew members and their families and recreational Internet browsing. Thus, an alternative system and method for providing digital communications and Internet access for ocean-going vessels is desired.

SUMMARY

The problems set forth above may at least in part be solved by a system and method that are capable of using mobile stations that act as store and forward repeaters to provide network connectivity.

In one embodiment, the method for transmitting data in a mobile digital network may include first broadcasting a first interrogation signal from a mobile station that has a data packet that is ready to be transmitted. The interrogation signal causes any other stations within range to respond with a response-to-interrogation signal. The mobile station may then transmit the data packet to the responding station. Once the responding station has received the data packet, it may send a confirmation signal to the first station acknowledging that the packet was correctly received. Checksums, encryption, and error checking and corrections codes may be used to ensure that the packet is received correctly and securely. The receiving station may be configured to store the data packet for future transmission to one or more other stations in a similarly manner.

The network may include both mobile stations and base stations. Mobile stations may be configured to be installed on a number of different vehicles (e.g., ships, aircraft, trucks, automobiles, or buoys). The mobile stations may be concentrated to provide coverage to traffic proceeding along known shipping lanes.

The mobile station may be powered by batteries, solar panels, or from the power system of the vehicle in which the mobile station is installed. Mobile stations installed in floating buoys may be configured with extendable antennas to improve their range. To prevent damage in severe weather, the mobile station may be configured with a weather sensor (e.g., a wind speed sensor) that causes the antenna to retract if predetermined conditions are met.

Each mobile station may be configured with a unique address that is compared with the destination address of received data packets. If a received data packet's destination address matches the mobile unit's unique address, then the data packet has arrived at it's final destination. The mobile unit may then transfer the data packet to an attached terminal or personal computer, or activate it's own user interface to indicate that data (e.g., an email message) has been received. If the packet's destination address does not match the receiving station's unique address, then the receiving station may be configured to attempt to forward the packet to other stations. Note, even if no other stations are currently within range, the receiving station may be configured to store the packet until another station comes within range. Depending on the network configuration, this could be seconds (e.g., in the event of an aircraft coming quickly into range), minutes, hours, or days (e.g., in the event of a ship that has just passed into a remote area with no other ships having mobile stations within range. While networks that have large gaps in connectivity may not operate acceptably for activities such as Internet web browsing, non-real time activities such as email should nevertheless provide value those using the network. Advantageously, the use of costly satellite time and equipment may be avoided. In some embodiments, wireless transmission using cellular technology may be used.

In one embodiment, a mobile station for transmitting data in a mobile digital network may include an antenna, a transceiver coupled to the antenna, a processor coupled to the transceiver, a data storage memory coupled to the processor; and a power supply coupled to the processor and the transceiver. The processor may be configured to cause the transceiver to broadcast a first interrogation signal in response to receiving a data packet that is to transmitted. The processor may be configured to transmit the data packet in response to detecting a response-to-interrogation signal. The processor may also be configured to store the data packet in the memory and repeat the interrogation and transmission cycle until a destination-receipt signal corresponding to the data is received. The mobile station may also be configured to cause the memory to erase the data packet corresponding to a particular transmitted data signal for which the mobile station has received a confirmation-of-receipt message.

Different antenna configurations may be used based on the exact implementation (e.g., omni-directional whip antennas, or directional antennas such as dish antennas).

In some embodiment, the mobile station may be configured to determine whether the source of the response-to-interrogation signal has already received a copy of the data before transmitting the data in order to save power and/or bandwidth. The mobile station may be configured with a motor rotatably connected to the antenna, wherein the mobile station's processor is configured to cause the motor to rotate the antenna (if a directional antenna is used). Note, rotation may include either the horizontal and/or vertical axis. The mobile station may also include a wind sensor coupled to the processor, and the processor may be configured to cause the motor to lower the antenna in response to detecting winds greater than a predetermined threshold.

The mobile station may also include a global positioning system (GPS) module configured to provide the processor with position and/or orientation information. This information may be shared amongst the different stations in the network (e.g., base stations and mobile stations) to allow for more efficient routing of data. Less expensive mobile stations may be configured with compasses to provide orientation information.

The network may include both mobile stations and base stations (e.g., with a traditional internet connection). The stations may be configured to act as store-and-forward repeaters. Also, the stations may be configured to purge data packets that are older than specified maximum age to prevent memory congestion or overflows.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
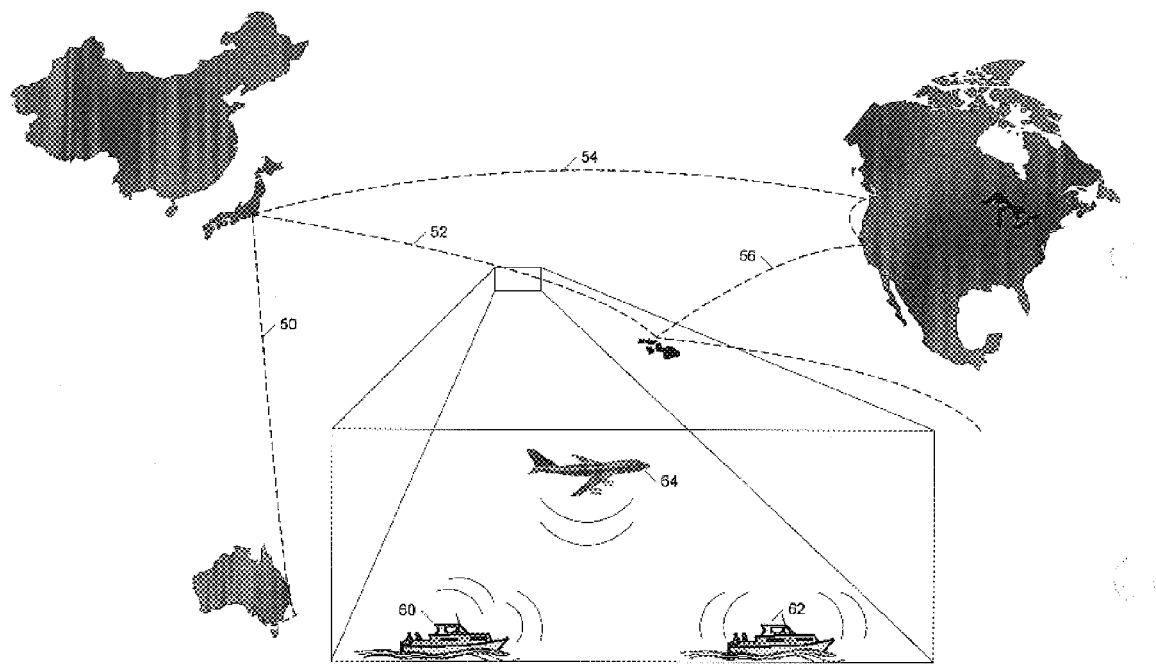
FIG. 1 is a diagram illustrating one embodiment of a system for providing digital communications and/or Internet access for mobile vessels traveling in areas without access to traditional wireless (cellular, non-satellite) systems.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Turning now to FIG. 1, one embodiment of a system for providing digital communications and Internet access for mobile vessels traveling in areas without access to traditional wireless (cellular) systems is shown. In this embodiment, a plurality of mobile stations are provided that are configured to installed on mobile platforms such as ocean-going vessels 60 and 62, and transoceanic aircraft 64, which are in the midst of transpacific voyages. Since most shipping vessels follow established shipping lanes (see e.g., 50–58), network coverage may be provided to the majority of shipping vessels by covering only a very small fraction of the surface area of an ocean. If network coverage is insufficient relying solely on shipboard mobile stations, aircraft and/or buoys may also be outfitted with mobile stations. Such buoys may be particularly useful in areas where ship and aircraft traffic is sparse.

Even with outfitting entire fleets of cargo and container ships with mobile stations, there are likely to be some gaps in coverage. While buoys outfitted with mobile stations may serve to further improve coverage, gaps in coverage are nevertheless likely to occur. Thus, each mobile station may be configured to act as a buffer/repeater by storing data to be transmitted until the data can be delivered.

Figure 2:
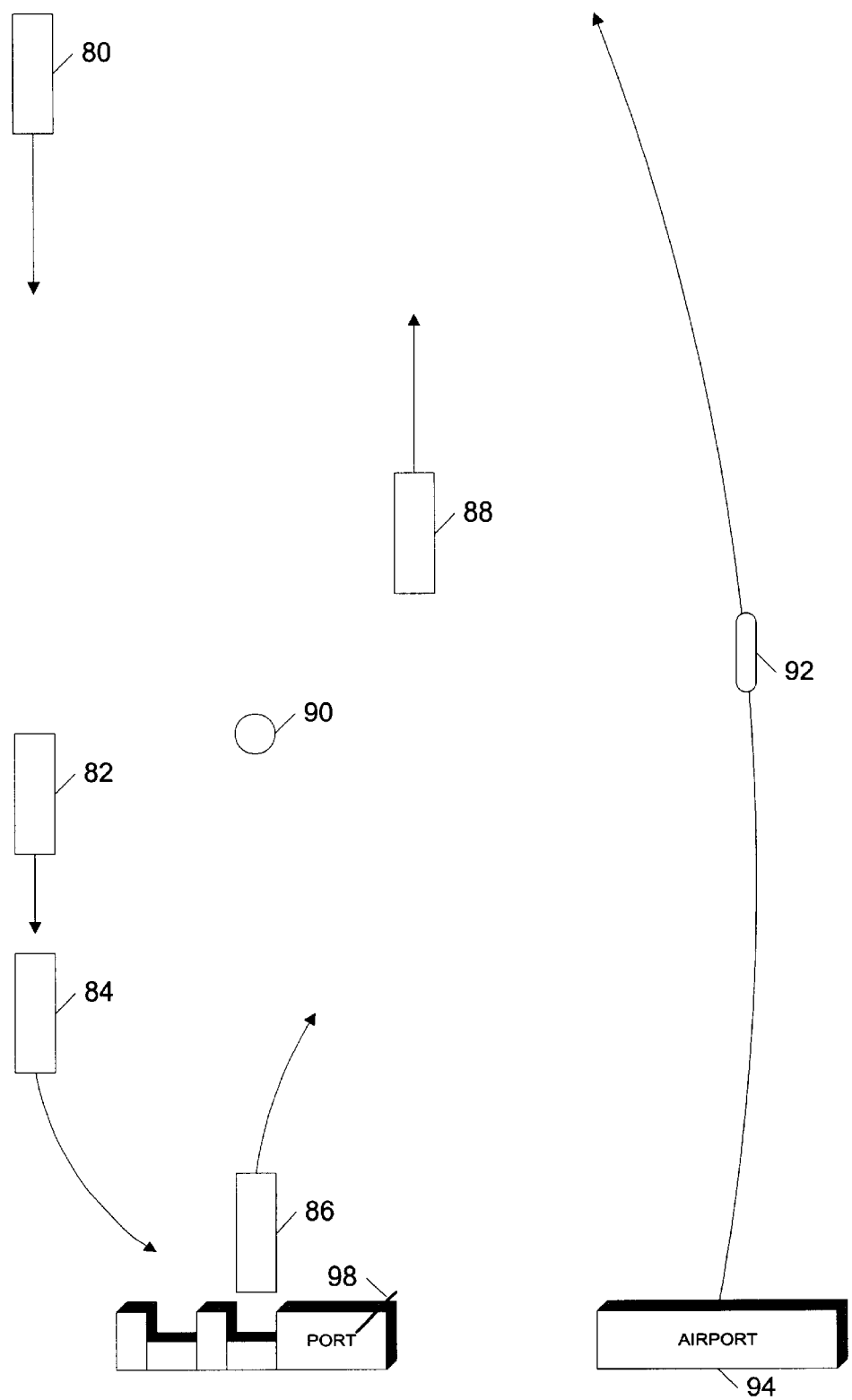
FIG. 2 is a figure illustrating more details of one embodiment of a system for providing digital communications and/or Internet access for mobile vessels traveling in areas without access to traditional wireless (cellular, non-satellite) systems.

Turning now to FIG. 2, more details of one embodiment of a system for providing digital communications and Internet access for mobile vessels traveling in areas without access to traditional wireless (cellular) systems are shown. In this figure, blocks 80–88 represent ships heading to and from a port 96. Each ship has a directional vector associated with it to illustrate it's current speed and course. As shown in the figure, port 96 may be configured with a base station 98. In one embodiment, the base station may be a higher power, stationary version of the mobile repeater with an Internet connection (e.g., a telephone dial-up connection, ISDN, DSL, Cable, T1, or other type of connection). As explained in greater detail below, the base station may be configured to receive data (e.g., email messages and http content requests generated during web browsing) and retransmit it to any corresponding destination via the Internet connection. Note, depending on the protocol used by the mobile network, the base station may be configured to reformat the data received from mobile stations into standard email and web protocols. For example, base station 98 may be configured to act as a firewall or router and thereby hide portions of the mobile station's addresses from the remainder of the Internet.

As noted above, in some cases, ships alone may not provide enough network coverage for a persistent point to point connection between all ports. In some embodiments additional mobile stations may be installed in aircraft that routinely fly over the shipping corridors or other portions of the ocean for which coverage is desired. Since aircraft often cruise at altitudes of roughly 10,000 meters or higher, this height would provide them with an improved range and thus greater coverage areas. While the fundamental operation of the mobile units may be the same regardless of their particular installation (e.g., ship, aircraft, or buoy), particular components such as their antenna system may be optimized for their particular installation. For example, mobile stations installed in aircraft may be configured with antenna systems optimized for sending and receiving signals in a downward direction rather than a horizontal or upward direction.

Figure 3:
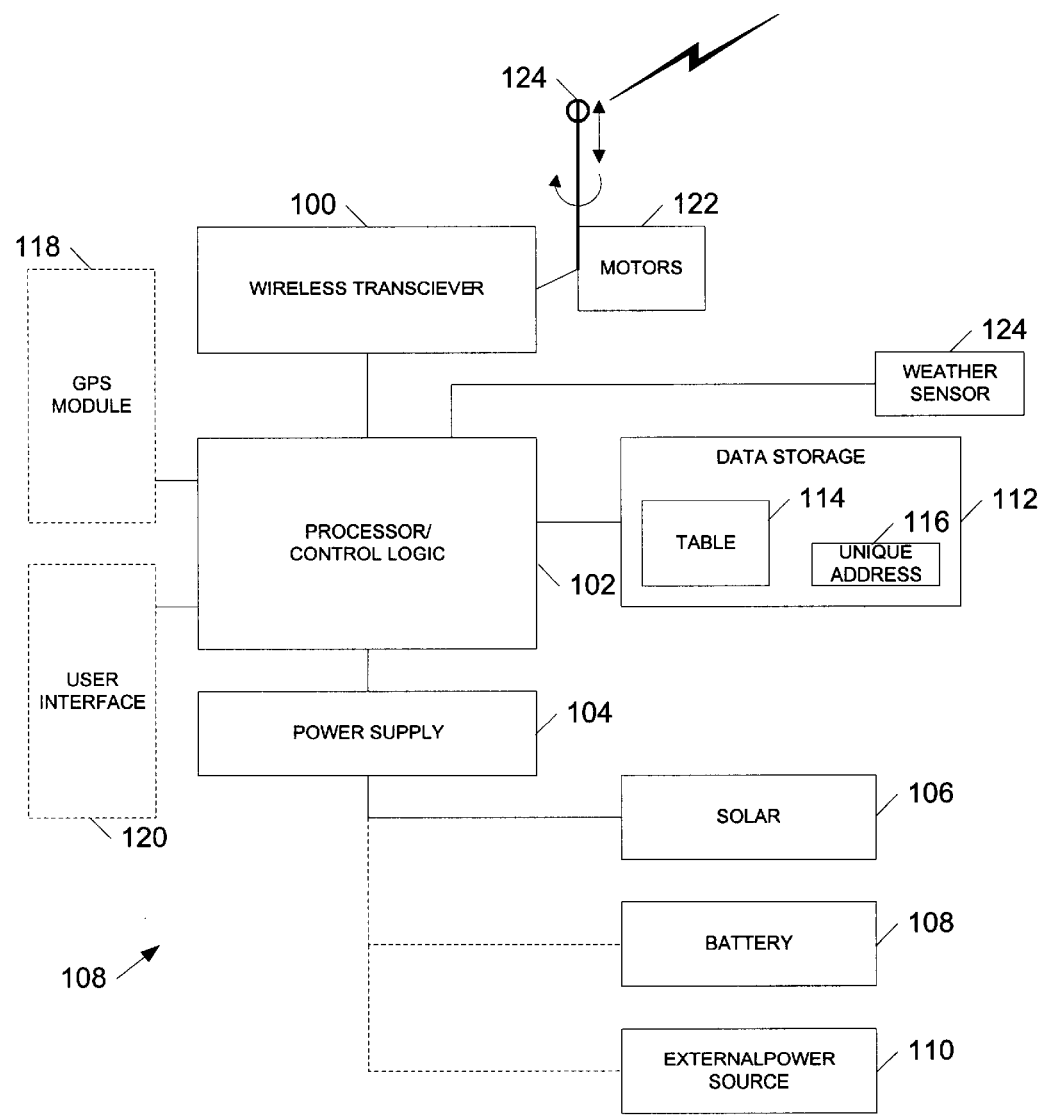
FIG. 3 is a figure illustrating one embodiment of a mobile station useable to implement a system for providing digital communications and/or Internet access for mobile vessels traveling in areas without access to traditional wireless (cellular, non-satellite) systems.

Turning now to FIG. 3, one embodiment of a mobile station 120 is shown. In this embodiment, the mobile station 120 comprises a transceiver 100, a processor/control logic 102, a power supply 104, a data storage memory 112, and an antenna 124. Processor/control logic 102 is coupled to transceiver 100, data storage memory 112, and power supply 104. Transceiver 100 is coupled to antenna 124.

In some embodiments, the mobile station 120 may also include one or more motors 122 controlled by processor/control logic 102 and/or transceiver 100. Motors 122 may be configured to rotate antenna 124 in embodiments of mobile station 120 that utilize a directional antenna 124. In some embodiments, motors 122 may also be configured to extend a telescopic boom to give antenna 124 more height. However, given the unpredictable environment which the mobile units may experience (e.g., ocean storms or hurricanes), mobile station 120 may be configured with a weather sensor 124 (e.g., a wind sensor) that is coupled to processor/control logic 102. The processor/control logic may be configured to cause motors 122 to retract antenna 124 in the event that the winds reach a predetermined level of severity. The processor/control logic may be configured with hysteresis to keep the antenna retracted for a predetermined amount of time before re-extending the antenna to prevent the antenna from being repeatedly extended and extracted in gusting wind conditions.

As noted above, mobile station 120 may be configured with a directional antenna. In some embodiments, mobile station 120 may be configured with a direction sensor and/or GPS module 118. This may be particularly useful if the mobile station is installed in a buoy. In such installations, the processor/control logic 102 may be configured to use the GPS module 118 to determine the buoy's current position. If the buoy drifts more than a predetermined maximum distance from the shipping lane, processor/control logic 102 may be configured to generate a warning message that is transmitted to a predetermined base station or Internet email address. Advantageously, upon receiving the warning message, the operators of the wireless network may be configured to use the GPS data to retrieve the wayward buoy and redeploy it in a more useful location (e.g., closer to the shipping lanes).

In another embodiment, mobile station 120 may be configured to maintain a database of other mobile station's positions based on GPS data from their GPS modules. Mobile station 120 may then use this information to orient antenna 124 accordingly for best reception to a particular destination mobile unit.

In some embodiments, mobile station 120 may be configured with user interface module 120. For example, user interface 120 may be a display and keyboard, or an entire personal computer. In these embodiments, mobile station 120 may be configured as a stand-alone email and/or Internet solution for the particular vessel upon which the mobile station is deployed.

As noted above, mobile station 120 may be configured for a number of different deployments (e.g., ship, aircraft, buoy, land vehicle, or stationary base). If mobile station 120 is configured for buoy deployment, power supply 104 may include a solar panel 106 and a batter 108 for providing power. In other deployments, mobile station 120 may be configured with a connection to a external power source 110 (e.g., the diesel generators of a cargo ship) and/or battery 108.

Each mobile station may be configured with a data storage 112 (e.g., flash memory, static or dynamic random access memory, hard drive). In some embodiments, data storage 112 may be configured to store data that is awaiting transmission to another station. As described in greater detail below, data storage 112 may also be configured to store a unique network address for mobile station 120 and a table 114 for storing information about transmitted data. Table 114 may include entries for each data packet transmitted, but not yet acknowledged as received. Due to the constantly moving nature of the network created by mobile stations 120, it may be difficult to immediately transmit a data packet to its destination station. As a result, each station may be configured to transmit the data packet to all other stations within range in a broadcast mode. Even after the data packet has been transmitted to one or more stations, the originating station may be configured to store the packet in data storage memory 112 until it receives a destination-receipt signal confirming that the intended destination received the message. If the data packet has multiple destinations, each station receiving a copy of the packet may be configured to store the packet and to transmit it to any other stations in range until a destination-receipt signal is received from all intended recipients. To prevent unnecessary transmissions, each station may be configured to determine whether other stations in range have already received the data packet before initiating transfer of the data packet.

Since the stations may be continually moving relative to each other, the stations may be configured to periodically issue interrogation signals (e.g., in all directions) to determine which, if any, stations are within range. If a station responds to the interrogation signal, the originating station may be configured to begin transfer of any data packets that the responding station or stations have not already received. The stations may be configured to store data packet tracking information (e.g., which packets have been received, sent, and acknowledged) in table 114. The stations may also be configured to determine if they are the final destination for a packet by comparing the packet's destination address with the unique address 116 stored in data storage memory 112.

Figure 4:
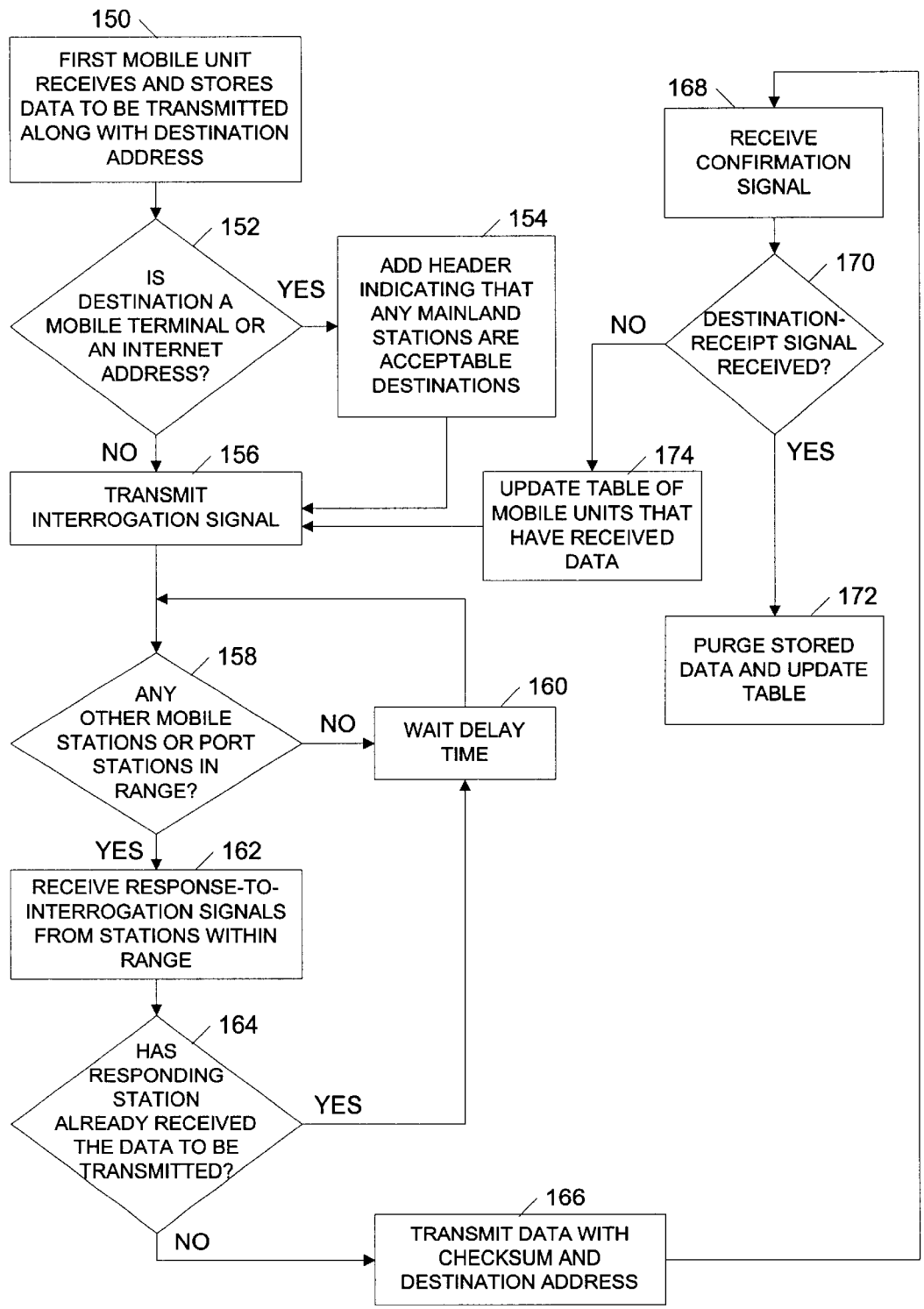
FIG. 4 is a flowchart illustrating one embodiment of a method for providing digital communications and/or Internet access for mobile vessels traveling in areas without access to traditional wireless (cellular, non-satellite) systems.

Turning now to FIG. 4, a flowchart of one method for operating a wireless mobile network is shown. In step 150, a first mobile station receives and stores a data packet that is to be transmitted. Along with the data packet the first mobile station receives at least one destination address. In step 152, the data packet is examined to determine whether the packet's destination is a mobile station or an Internet address. In some embodiments, each station in the mobile network may be configured with a unique address for identification purposes. For intra-network packets, the unique address may be compared with the destination address to determine which station or stations are the final destination for the packet. If the data packet is an email message, however, the destination address may be an internet address in lieu of a unique network address. In some embodiments a header may be added to the packet indicating that any base station with Internet access is a suitable destination as far as the mobile stations are concerned because the base station will take care of forwarding to the final Internet email address. In this case each station may be configured to convey copies of the packet to other stations until a base station receives the packet. The base station may then forward the packet as an email message via the base station's Internet connection. Each base station may be configured to send an Internet instant message to the other base stations to ensure that another station has not already received and forwarded the packet. If another base station has already sent the packet as an email message, then the later base station may be configured to delete the packet without sending it. If no other base stations have received the packet, then the base station may be configured to forward the packet as an Internet email message. The base station may be configured to then convey a destination-receipt signal to the other stations in the network. Depending on the network configuration, in some embodiments with multiple base stations (e.g., at multiple shipping ports such as Tokyo, San Francisco, Seattle, the Panama Canal) the base stations may also send instant messages to the other base stations which in turn begin the propagation of the destination-receipt signal from their locations. In this way, the resources in the mobile stations devoted to storing the packet may be released more quickly.

The data packet may be received from a computer or terminal connected to the mobile station, or the packet may have come from another station (e.g., mobile or base). The data to be transmitted may be packetized into packets having a predetermined maximum size. In response to receiving the packets, the mobile station may be configured to initial an interrogation process (step 156). In one embodiment, this may entail transmitting an interrogation signal in all directions (e.g., across 360 degrees) and listening for any responses (step 158). If no other mobile stations are within range, the mobile station may be configured to wait a predetermined delay time before again attempting the interrogation signal (step 160). This may be convenient to save power if necessary. If only relatively slow-moving ships are used, the usefulness of constant interrogations is less likely to productive. If, however, fast moving aircraft are also used, the delay may be shortened accordingly.

If the mobile station receives a response to the interrogation signal from another station within range (step 162), then the mobile station may be configured to query the responding station or stations (step 164) to determine whether they have already received a copy of the data packet (and whether they already have received a destination-receipt signal). This is possible because the responding mobile stations may have received the packet or destination-receipt signal from another sequence of stations at some earlier time. If this is the case, then the mobile station may be configured to refrain from forwarding the packet and instead again wait another delay period (step 160).

If, however, the responding station or stations have not received the data packet, the mobile station may be configured to transit the packet (step 166). Depending upon the network configuration, different forms of encryption and checksums may be used to ensure security and proper receipt of the packet by the responding station. The responding station may be configured to transmit a confirmation signal to confirm receipt of the packet in good form and with a valid checksum (step 168).

The station that received the packet may also be configured to perform a comparison of the packet's destination address with the station's unique identifier, as described above (step 170). If the station that received the packet is the destination packet, then the station may be configured to transmit a destination-receipt signal (step 170). Each station receiving this destination-receipt signal may be configured to purge the stored packet since it has already been delivered (step 172). The stations may also be configured to update their status tables to reflect that the packet has been successfully forwarded to the receiving station or stations. As noted above, this information may be used to reduce network overhead be reducing the number of times a packet is retransmitted unnecessarily.

In some embodiments, some data packets may become "stale". For example, a ship with a mobile station may receive a data packet just as the ship is heading out of range for a long voyage that is not following any known shipping lane. Assuming the ship does not come within range of any other ships, buoys, aircraft, or base stations that are part of the network, after a predetermined time the ship may be configured to age and discard the packet as being stale.

Note that the method illustrated in the figure is but one of a number of different possible variations that will become evident to one of skill in the art after reading this disclosure. Additional steps may also be added to method. For example, in more elaborate embodiments GPS information from the mobile stations may be used to select which mobile stations should receive a copy of a packet. For example, in the example set forth above, the ship heading away from any known shipping lanes or ports with base stations would not need to receive copies of packets since it is unlikely that the transmission would further the cause of getting the data packet to its proper destination.

Figure 5:
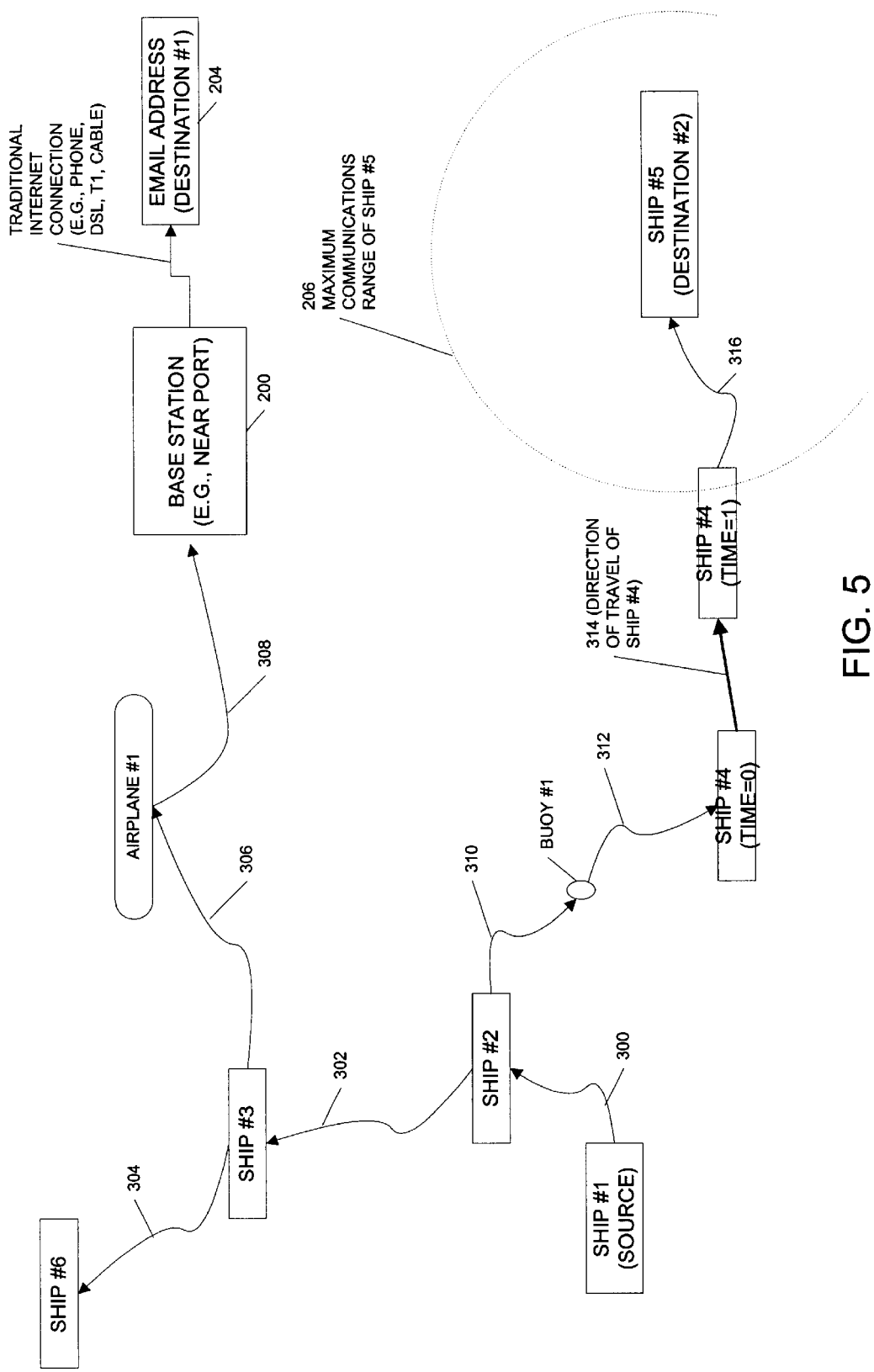
FIG. 5 is a diagram illustrating an example of one embodiment of a method for operating a system configured to provide digital communications and/or Internet access for mobile vessels traveling in areas without access to traditional wireless (cellular, non-satellite) systems.

Turning now to FIG. 5, a diagram illustrating an example of one embodiment of a method for operating a system configured to provide digital communications and/or Internet access for mobile vessels traveling in areas without access to traditional wireless (cellular, non-satellite) systems is shown. In the figure, ship #1 is the source for packet. In this example, a crew member composes an email that is to be sent to an Internet email address and another crew member in ship #5. Ship #1 conveys the packet to ship #2 via wireless transmission 300 (e.g., according to the method of FIG. 4). Ship #2 determines that both buoy #1 and ship #3 are within range. Thus, ship #2 transmits the packet to buoy #1 (via transmission 310) and ship #3 (via transmission 302). Ship #3 similarly transmits the packet to ship #6 and airplane #1. Airplane #1 in turn transmits the packet to base station 200, which is configured with an Internet connection. Base station 200 then transmits the packet to the destination Internet email address 204.

Meanwhile, buoy #1 transits the packet to ship #4 at time=0. At time=0, ship #4 is not within range of any other stations, so ship #4's mobile station stored the packet and destination address information and waits until time=1, at which time ship #4 is within range of ship #5 (as designated by ring 206). Once within range, ship #4 is configured to forward the packet to ship #5 (the second destination). As noted above, destination-receipt signals may be generated by ship #5 and base station 200 and transmitted back through the network.

In one embodiment, frequencies in the range of 2.15 and 5.0 GHz may be used. These frequencies may allow ranges on the order of 50 kilometers for transmission powers of 10 watts. Assuming a shipping lane length of roughly 15,000 kilometers (e.g., from the west coast of the United States to the east coast of Japan), on the order of 300 buoys would be used for each shipping lane. Note, however, that the actual traffic patterns of the cargo and fishing vessels that are part of the network may be taken into account to reduce the number of buoys in certain locations. Similarly, as noted above some buoys may be outfitted with telescopic booms allowing greater ranges. Furthermore, while transmission powers for land-based systems tend to be tightly controlled, it is likely that water-based systems may be able to transmit at high powers than their land-based counterparts.

Higher frequencies may be potentially be used for increased bandwidth, but they are more likely to be affected by atmospheric and meteorological phenomena. Furthermore, their reduced range (e.g., on the order of 5 kilometers for 24–40 GHz) would likely require a larger number of mobile stations for effective throughput.

In looking at the relative power requirements for omnidirectional wireless communications at different distances, it is useful to think of the total power ($P_0$) radiated as spreading out and striking the surface of a sphere which is centered on the transmitter and has a radius equal to the distance between the transmitter and receiver.

We know that the surface area of a sphere of radius R is given by $$A = 4(pi)R^2$$

This means that if the power is emitted uniformly in all directions (isotropically) then the amount of power which strikes every square centimeter of the sphere is given by $$P = P_0/4(pi)R^2$$

If our receiver has an area of $A_r$ square centimeters, then it will detect an amount of power $$P_r = A_r P_0/4(pi)R^2$$

If then R=50 km, $$P_r = A_r P_0/4(pi)(50\ km)^2$$

On the other hand, if R=100 km, $$P_r = A_r P_0/4(pi)(100\ km)^2$$

Which is 4 times smaller, so that in order to have the receiver detect the same amount of power, the transmitter power $P_0$ must be 4 times larger for the system using 100 km spacing. Note, the example is simplified and does not take into account the potential for increased atmospheric attenuation.

One of the most straightforward ways to make up the difference in power for increased ranges is through antenna design. Virtually all antennas in use today radiate energy preferentially in some direction. An antenna used by a commercial terrestrial radio station, for example, is trying to reach people to the north, south, east, and west. However, the commercial station will use an antenna that radiates very little power straight up or straight down because their are typically few, if any, receivers located directly above or below the antenna.

A properly designed antenna will concentrate most of the transmitter power to radiate in the direction of the intended receiver, thus wasting little or no energy in transmitting in directions where there are no listeners. One easy way in which to do this is to make the antenna larger. Doubling the diameter of a reflector antenna will reduce the area of the beam spot to one fourth of what it would be with a smaller reflector. This property is typically referred to in terms of the gain of the antenna. Gain identifies how much more power will fall on 1 square centimeter of the antenna than would fall on that same square centimeter (or square meter or square mile) if the transmitter power were spread uniformly (isotropically) over all directions. The larger antenna described above would have four times the gain of the smaller one.

Thus, in one embodiment, the range of the mobile stations may be increased through the use of directional antennas. Since the mobile stations are configurable to be placed on moving platforms such as ships, aircraft, and even land-based vehicles (e.g., trucks), the directional antenna may be rotatably mounted (e.g., using a motor) to allow the mobile station to periodically scan in a 360 degree range for other mobile stations. Similarly, the antenna may be mounted on a vertically actuated boom that increases the height of the antenna during reception and transmission. To protect the antenna and mobile station during severe weather, the mobile station may be configured with a wind speed monitor. The control unit of the mobile unit may be configured to retract the boom and antenna in response to the window speed reaching a predetermined level that may be hazardous to the mobile unit.

Antenna gains, like many power specifications are usually quoted in decibels (dB). The ratio of two power levels in decibels is defined as:

$$R = 10 \log_{10}(P_1/P_2)$$

If the smaller of the two antenna mentioned above concentrated 100 times as much power on the receiver as would an antenna which radiated isotropically, then the gain of the smaller antenna would be $$10 \log_{10}(100) = 20 \, dB$$

The larger antenna then concentrates 4 times as much power at the receiver as does the smaller one, which is 400 times as much as the one which radiates isotropically. Therefore its gain is $$10 \log_{10}(400) 26 \, dB$$

The power supplied by the larger is (400/100)=4 times as great as the smaller, therefore its gain should be greater than the small one by $$10 \log_{10}(4) 6 \, dB\text{—which it is.}$$

Power levels are sometimes specified in dBW or dBm. These expressions indicate that the power level in question is being specified as a ratio to 1 watt or 1 milliwatt. For example, 13 dBW means that $$10 \log_{10}(\text{the power level in watts}) = 13$$

In other words, the given power level is really about 20 watts. Similarly, 13 dBm would correspond to 20 milliwatts of power. As these equations illustrate, the less accurate the tracking, the more power the transmitter will have to provide.

A system and method for providing digital communications and Internet access for mobile vessels traveling in areas without access to traditional wireless (cellular) systems has been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A method for transmitting data in a mobile digital network, the method comprising:
    broadcasting a first interrogation signal from a first mobile station;
    receiving the first interrogation signal in a second mobile station;
    transmitting a first response-to-interrogation signal from the second mobile station to the first mobile station;
    transmitting a data packet from the first mobile station to the second mobile station;
    receiving the data packet in the second mobile station;
    transmitting a confirmation signal to the first mobile station from the second mobile station to confirm receipt of the data packet;
    storing the data packet in the second mobile station;
    periodically transmitting a second interrogation signal from the second mobile station, and, in response to detecting a second response-to-interrogation signal from a third mobile station, transmitting the stored data packet from the second mobile station to the third mobile station.

2. The method of claim 1, wherein one or more of the mobile stations are on ships.

3. The method of claim 1, wherein one or more of the mobile stations are on aircraft.

4. The method of claim 1, wherein one or more of the mobile stations are on trucks.

5. The method of claim 1, wherein one or more of the mobile stations are on automobiles.

6. The method of claim 1, wherein one or more of the mobile stations are on buoys.

7. The method of claim 6, wherein the buoys include a solar panel.

8. The method of claim 1, wherein the data packet includes a checksum, and wherein the second mobile station is configured to use the checksum to verify the accuracy of the received data packet before the transmitting of the confirmation signal.

9. The method of claim 1, wherein the data signals include at least one destination address, wherein the mobile stations each have a unique address, and wherein the mobile stations are configured to examine the destination address of the received data packet to determine whether the mobile station is a designated destination for the data packet, wherein the mobile stations are configured to transmit a destination-receipt signal in response to determining that the mobile station is a designated destination for the data packet.

10. The method of claim 7, wherein the signals are transmitted using whip antennas in an omni directional cell configuration.

11. A mobile station for transmitting data in a mobile digital network, wherein the mobile station comprises:
    an antenna;

a transceiver coupled to the antenna;

a processor coupled to the transceiver;

a data storage memory coupled to the processor; and a power supply coupled to the processor and the transceiver, wherein the processor is configured to cause the transceiver to broadcast a first interrogation signal in response to receiving data that is to be transmitted, wherein the processor is configured to transmit the data in response to detecting a response-to-interrogation signal, wherein the processor is configured to store the transmitted data in the memory and repeat the interrogation and transmission until receiving a destination-receipt signal corresponding to the data.

12. The mobile station of claim 11, wherein the processor is configured to determine whether the source of the response-to-interrogation signal has already received a copy of the data before transmitting the data.

13. The mobile station of claim 11, wherein the response-to-interrogation signal is from another mobile station or a base station.

14. The mobile station of claim 11, further comprising a floating buoy.

15. The mobile station of claim 11, wherein the processor is configured to use encryption to encrypt the data before the data is transmitted.

16. The mobile station of claim 11, wherein the memory includes a unique address and a table of information identifying transmitted data packets and the addresses of other mobile stations having received the transmitted data packets and where or not a confirmation-of-receipt message has been received.

17. The mobile station of claim 16, wherein the processor is configured to cause the memory to erase entries in the table corresponding to a particular transmitted data signal for which the mobile station has received a confirmation-of-receipt message.

18. The mobile station of claim 11, further comprising a means for elevating the antenna.

19. The mobile station of claim 11, further comprising a wind sensor coupled to the processor, wherein the processor is configured to cause the means for elevating the antenna to lower the antenna in response to detecting winds greater than a predetermined threshold.

20. The mobile station of claim 11, wherein the antenna is an omni-directional dipole antenna.

21. The mobile station of claim 11, further comprising a global positioning system (GPS) module configured to provide the processor with position information.

22. The mobile station of claim 11, further comprising a global positioning system (GPS) module configured to provide the processor with position and orientation information.

23. The mobile station of claim 11, further comprising a compass configured to provide the processor with orientation information.

24. The mobile station of claim 11, further comprising a motor rotatably connected to the antenna, wherein the processor is configured to cause the motor to rotate the antenna, wherein the antenna is directional.

25. The mobile station of claim 11, wherein the mobile station is configured to be housed in an airplane.

26. The mobile station of claim 11, wherein the mobile station is configured to be housed in an buoy.

27. The mobile station of claim 11, wherein the mobile station is configured to be housed in a ship.

28. A system for transmitting data in a mobile digital network, the system comprising:

a base station configured to be coupled to the Internet;

a first mobile station configured to be installed on a first ship, wherein the first mobile station comprises:
an antenna,
a transceiver coupled to the antenna,
a controller coupled to the transceiver, and
a memory coupled to the controller, wherein the controller is configured to cause the transceiver to broadcast a first interrogation signal in response to receiving data that is to transmitted, wherein the controller is configured to transmit the data in response to detecting a response-to-interrogation signal, wherein the controller is configured to store the transmitted data in the memory and repeat the interrogation and transmission until receiving a destination-receipt signal corresponding to the data; and a second mobile station configured to be installed on a second ship.

29. The system of claim 28, further comprising a third mobile station configured to installed on an aircraft.

30. The system of claim 28, further comprising a fourth mobile station configured to be installed on a buoy.

31. The system of claim 28, wherein each mobile station is configured to act as a store-and-forward repeater for data received by the mobile station.

32. The system of claim 28, wherein each mobile station is configured to purge a particular set of data in response to receiving a destination-receipt signal corresponding to the particular set of data.

33. The system of claim 28, wherein each mobile station is configured to purge a particular set of data in response to receiving a destination-receipt signal corresponding to the particular set of data.

34. The system of claim 28, further comprising a base station installed in a fixed location and coupled to an Internet connection.

* * * * *